United States Patent [19]

Lo

[11] Patent Number: 5,559,801
[45] Date of Patent: Sep. 24, 1996

[54] PROGRAMMABLE PACKET SAMPLING FOR NETWORK MANAGEMENT

[75] Inventor: William Lo, Santa Clara, Calif.

[73] Assignee: Advanced Micro Devices Inc., Sunnyvale, Calif.

[21] Appl. No.: 438,982

[22] Filed: May 11, 1995

Related U.S. Application Data

[63] Continuation of Ser. No. 376,153, Jan. 20, 1995, abandoned.

[51] Int. Cl.$^6$ ....................................................... H04J 3/06
[52] U.S. Cl. .................... 370/94.1; 370/97; 370/105.3; 375/373; 380/48
[58] Field of Search .................... 380/6, 8, 9, 25, 380/48, 49; 375/211, 212, 342, 371, 373; 395/186, 187.01; 370/53, 85.1, 85.13, 97, 94.1, 13.1, 68.1

[56] References Cited

U.S. PATENT DOCUMENTS

| | | | |
|---|---|---|---|
| 4,680,755 | 7/1987 | Reames | 370/94.1 |
| 4,901,348 | 2/1990 | Nichols et al. | 370/60 |
| 5,099,517 | 3/1992 | Gupta et al. | 380/29 |
| 5,161,192 | 11/1992 | Carter et al. | 375/212 |
| 5,177,788 | 1/1993 | Schanning et al. | 380/23 |
| 5,179,554 | 1/1993 | Lomicka et al. | 370/85.13 |
| 5,206,885 | 4/1993 | DeLuca et al. | 375/342 |
| 5,251,203 | 10/1993 | Thompson | 375/94.1 |
| 5,351,237 | 9/1994 | Shinohara et al. | 370/68.1 |
| 5,353,353 | 10/1994 | Vijeh et al. | 370/85.1 |
| 5,373,534 | 12/1994 | Nagamoto et al. | 375/342 |

OTHER PUBLICATIONS

"Lecture Notes In Computer Science," Edited by Goos, G. and Hartmanis, J., Local Area Network Security, Edited by Berson, T. A. and Beth, T., Workshop LANSEC '89, E.I.S.S. Karlsruhe, FRG, Apr. 3–6, 1989, pp. 31–52.

"Information technology–Local and metropolitan area networks–Part 3: Carrier sense multiple access with collision detection (CSMA/CD) access method and physical layer specifications," ISO/IEC 8802-3, ANSI/IEEE Std. 802.3, Fourth edition, 1993-07-08. (front page only).

*Primary Examiner*—Benedict V. Safourek
*Attorney, Agent, or Firm*—Townsend and Townsend and Crew LLP

[57] ABSTRACT

A sampling repeater implementing a data packet sampling schedule includes a repeater front-end, a transmitter and a sampler. The transmitter, responsive to disrupt control signals, retransmits a data packet in a disrupted form, or an undisrupted form, to a management unit coupled to a management port. When one of the disrupt control signals are asserted, the data packet is retransmitted undisrupted as a sample packet. The management unit processes the sample packet and extracts any desired statistics. When none of the disrupt control signals are asserted, the disrupted data packet is retransmitted to the management unit. The disrupted data packet fails error checking and is ignored. The sampler periodically, according to the sampling schedule, asserts one of the disrupt control signals, to pass sample packets to the management unit. Thus, the management unit only processes a subset of the input data packets, rather than every data packet.

28 Claims, 5 Drawing Sheets

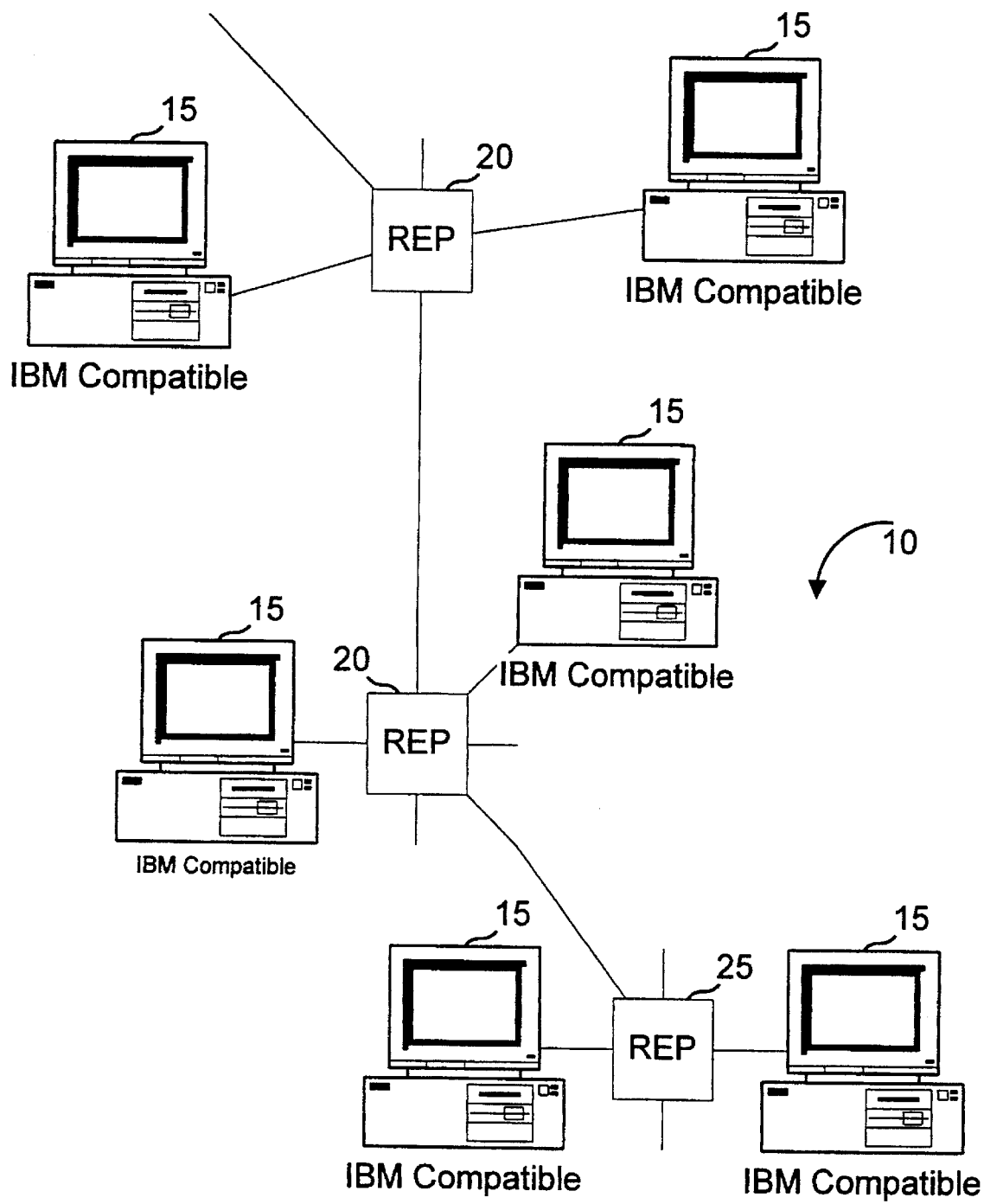
Fig_3

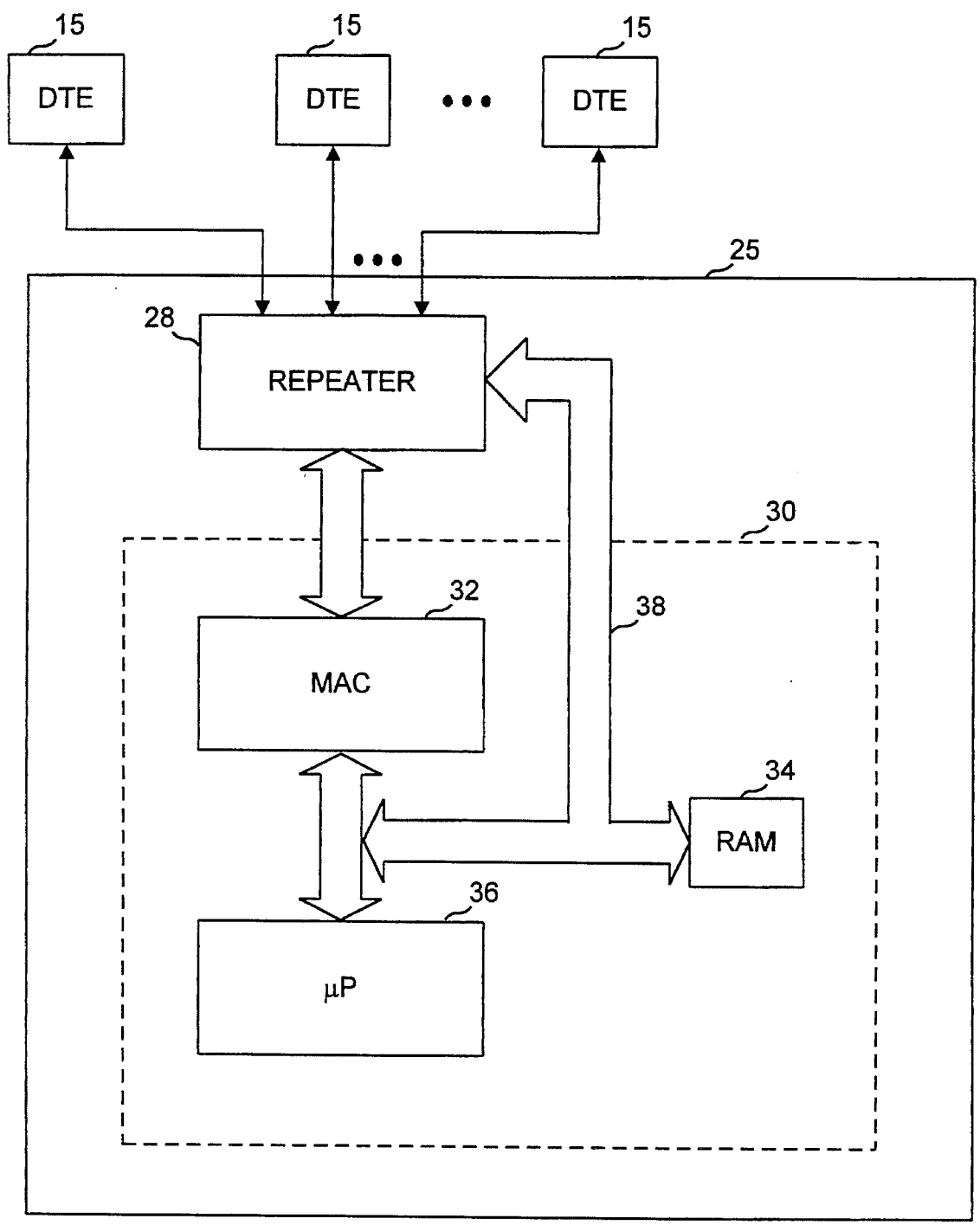
Fig_4

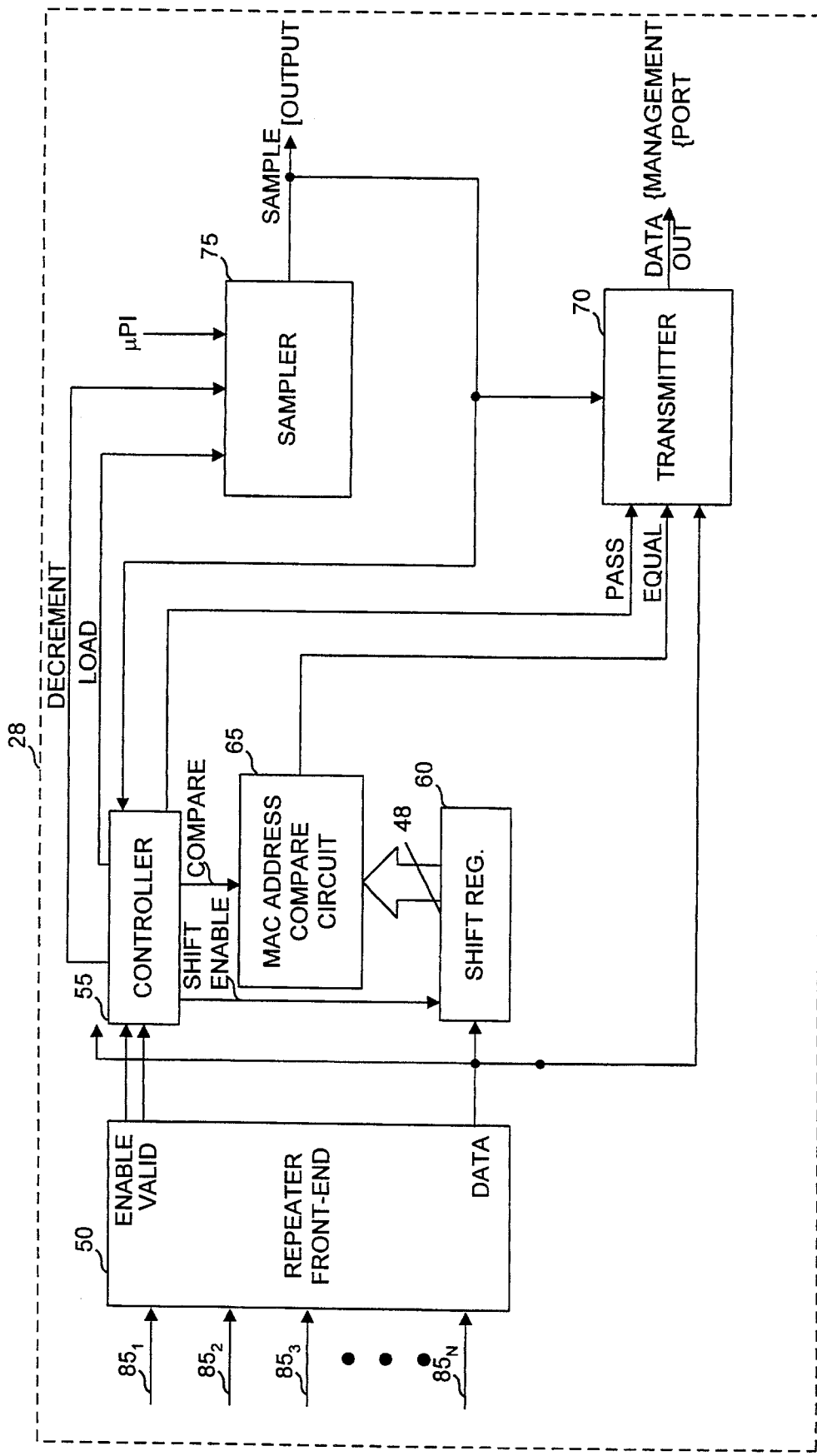
Fig_5

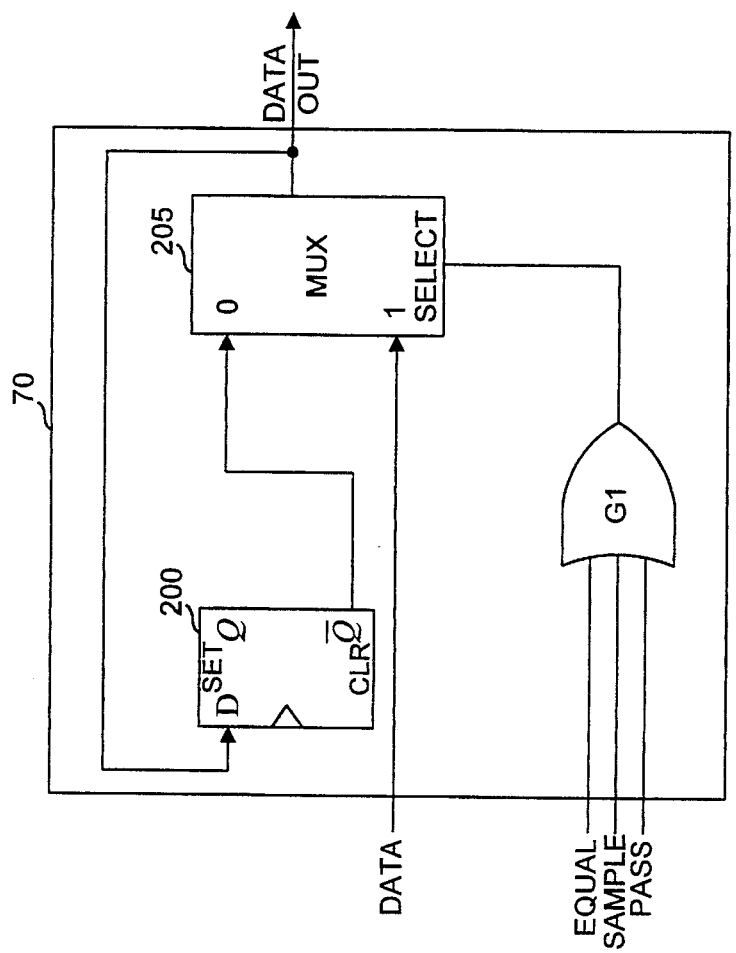
Fig_7
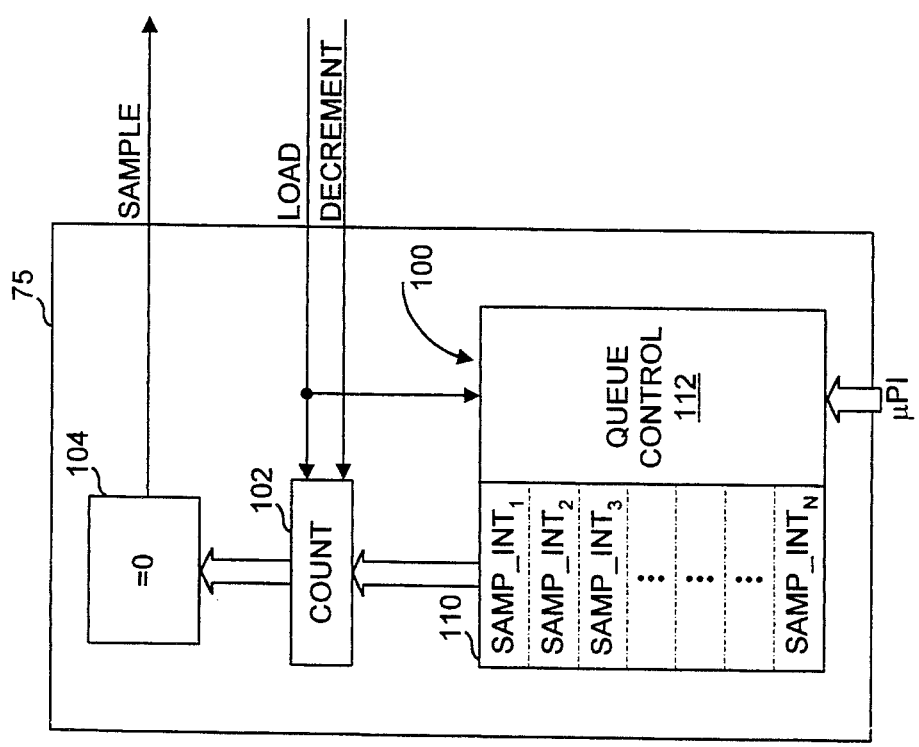
Fig_6

PROGRAMMABLE PACKET SAMPLING FOR NETWORK MANAGEMENT

CROSS-REFERENCE TO RELATED APPLICATIONS

This application is a continuation of "Programmable Packet Sampling for Network Management," U.S. patent application Ser. No. 08/376,153 filed Jan. 20, 1995, now abandoned. This application is related to "Address Tracking Over Repeater Based Networks," U.S. Pat. No. 5,353,353 issued on Oct. 10, 1994, "Repeater Security System," U.S. patent application Ser. No. 08/053,797 filed Apr. 26, 1993, "Apparatus and Method for Selectively Storing Error Statistics" now U.S. Pat. No. 5,353,353, U.S. patent application Ser. No. 08/337,634 filed Nov. 10, 1994, "Programmable Address Mapping Matrix for Secure Networks," U.S. patent application Ser. No. 08/366,809 filed Dec. 30, 1994, and "Programmable Delay of Disrupt for Secure Networks," U.S. patent application Ser. No. 08/366,808 filed Dec. 30, 1994, all hereby expressly incorporated by reference for all purposes.

BACKGROUND OF THE INVENTION

The present invention relates generally to data packet sampling within a local area network and more specifically to improved sampling in a secure computer network.

Networks of computers are commonly used in today's business environment. One common network system structure uses one or more repeaters. The repeater typically includes several ports. A particular data packet received at one port is retransmitted from the other ports of the repeater. Each repeater restores timing and amplitude degradation of data packets received on one port and retransmits them to all other ports, and hence over the network. For networks employing a CSMA/CD-type of network, such as an Ethernet network, every data packet passes through every repeater. Network administrators are thereby able to conveniently use each repeater as a device on the network from which to gather information concerning the operation of the network.

In traditional Ethernet (802.3 10BASE5) and Cheapernet (802.3 10BASE2), a coaxial cable provides a linear bus to which all nodes of a local area network are connected. A standard promulgated by the IEEE (IEEE Standard 802.3) defines various functionality for computer networks. This standard is expressly incorporated by reference for all purposes. Signaling is accomplished using a current synch technique wherein a center conductor of the coaxial cable is used for a signal and a shield conductor of the coaxial cable is used for a reference voltage (typically ground). Twisted pair Ethernet (802.3 10BASE-T) uses a standard voice grade telephone cable rather than the coaxial cable. The telephone cable uses separate pairs of conductive wires for transmission and reception.

When using twisted pair Ethernet, the network configuration is a star topology. The star topology provides for several end stations or data terminal equipment (DTE) devices all coupled to a multiport repeater located at a center of the star. The repeater performs signal amplitude and timing restoration. The repeater receives a bitstream at one Of its ports and restores signal amplitude levels and timing requirements. The repeater repeats the reshaped and retimed input bitstream to all of its other ports. In one sense, the repeater acts as a logical coaxial cable, permitting every node connected to the twisted pair network to receive each transmission from any other node, just as when a coaxial cable is used. The pairs of conductors use differential signaling, one pair for transmission and another pair for reception.

While a repeater is used in a traditionally wired coaxial Ethernet network as a mechanism to extend the physical distance limit of the network, in the IEEE 802.3 10BASE-T, the standard mandates the use of a repeater to provide connectivity between nodes whenever more than two nodes are present. Although physical signaling on the cabling differs between the traditional Ethernet-type of repeater and the twisted pair-type of repeater, the functionality of the repeaters are identical, as is the frame or packet format that is used to pass messages between the participating nodes on the network.

The frame commences with a preamble sequence which is an alternating ("1" and "0") pattern. The preamble sequence provides a single frequency on the network, in this case five megahertz (MHz) at the start of each frame, allowing a receiver to acquire and lock onto the associated bitstream. The preamble sequence is followed by a start of packet identifier that immediately precedes the data portion of the transmission. Either a start of frame delimiter (802.3) or synch sequence (Ethernet) delineates the start of the data portion of the message. Following the start of packet identifier are two address fields: a destination address (DA) and a source address (SA). These addresses are both forty-eight bit values and are transmitted least significant bit (LSB) first.

A media access controller (MAC) associated with each DTE uses the destination address to determine whether an incoming packet is addressed to the node it is associated with. When a receiving node detects a match between its own node address and an address transmitted in the destination address field, it attempts to receive the packet. Nodes having a MAC that does not detect a matching address typically ignore a remainder of the packet.

There are three types of destination addressing supported by the 802.3 standards:

1. Individual. The DA field contains an individual and unique address assigned to a single node on the network.
2. Multicast. When the first bit (LSB) of the DA is set, the remainder of the DA includes a group address. The group of nodes that are actually addressed is determined by a higher layer function. In general, use of a group address is designed to transmit a message to a logically similar subset of nodes on the network.
3. Broadcast. The broadcast is a special form of multicast address wherein the DA field is set to all "1's." This address is reserved, and all nodes on the network must be capable of receiving a broadcast message.

The MAC that transmits a data packet writes its own address into the SA field. This allows the transmitting MAC to identify those packets which it originates. The 802.3 standards do not require that a receiving MAC take any action based upon the SA field. In some applications, such as management, security or configuration, the SA field may be tracked and monitored.

A two-byte length/type field follows the SA field. The choice of length or type is dependent upon whether the frame is compatible with the IEEE 802.3 or the Ethernet standard. A higher order byte of the length/type field is transmitted first, with the LSB of each byte transmitted first.

A data field contains actual packet data that is transferred between end stations and is between forty-six to fifteen hundred bytes in length. A logical link control (LLC) function is responsible for fragmenting data into block sizes suitable for transmission over the network. Data bytes are transmitted sequentially with the LSB of each byte transmitted first.

A frame check sequence (FCS) is a four-byte field that contains a cyclic redundancy check (CRC) for the entire frame. The transmitting station computes the CRC throughout the DA, the SA, the length/type field, and data field. The transmitting station appends the FCS as the last four bytes of the frame. A receiving station uses the same CRC algorithm to compute the CRC for a received frame. The receiving station compares the CRC value it computes with the CRC value in the transmitted FCS. A mismatch indicates an error, such as a corrupted data frame. CRC bits of the FCS are transmitted in order: most significant bit (MSB) to LSB.

FIG. 1 and FIG. 2 are diagrams illustrating frame formats for an IEEE 802.3 Standard compliant frame and an Ethernet frame, respectively. Comparing the frame formats illustrates that a primary difference between the frame types is that the start of frame delimiter (SFD) for 802.3 is defined as a byte that has a "10101011" pattern whereas the start frame (synch) of Ethernet is a "11" sequence. Even so, in both cases, a total number of bits for the preamble plus the start of frame indication is sixty-four bits long.

The 802.3 and Ethernet standards both specify that a frame must be in the range of sixty-four to fifteen hundred eighteen bytes (excluding preamble/SFD). However, the actual data field in the 802.3 system is permitted to be smaller than the forty-six byte value that is necessary to ensure this minimum size. To handle a smaller size data field, the MAC of a transmitting station appends pad characters to the LLC data field before sending data over the network. The Ethernet standard assumes that an upper layer ensures that the minimum data field is forty-six bytes before passing data to the MAC, therefore the existence of appended pad characters in unknown to the MAC implementing an Ethernet format.

The 802.3 standard also uses a length field that indicates the number of data bytes that are in the data field only. Ethernet, on the other hand, uses a type field in the same two bytes to identify the message protocol type. Since valid Ethernet type fields are always assigned outside of the valid maximum 802.3 packet length size, both 802.3 and Ethernet packets can coexist on the same network. Hence, it has been found that it is important to be able to track and monitor the addresses for a variety of reasons. For example, for secure networks it may be important that authentication is required to ensure that the appropriate nodes on the network receive the information. In addition, as networks change in the number of nodes attached thereto, it becomes important to be able to associate an address with a particular port or the like within the network.

It is also important in secure networks to selectively prevent a node from receiving such address information unless the node requires the information. If a data packet is not destined for a particular node, the particular node generally does not have a need for information within the data packet.

Further, it is important to provide a mechanism to associate the addresses of each port of a repeater with the actual port number or identity of the device. Typically, unsecured repeaters are devices that are just used for signal amplitude and timing restoration. In all of the above-mentioned modes, the secure repeater must also be provided with the capability to detect and interpret the various fields within data packets that are transmitted on the network.

As described above, every data packet transmitted in the computer network includes a destination address to identify the recipient of the data packet. A secure repeater in a secure network may have one or more end stations attached to each port. Each end station has one unique address assigned, and possibly one or more multicast addresses. The secure repeater maintains a list of associated end stations for each output port. The security systems identified in the incorporated references use the destination address field from each data packet to route a data packet to only those output ports associated with the destination address. Output ports of the repeater associated with a destination address not matching the destination address receive a modified, or disrupted, data packet.

Managed repeaters include a management unit attached to an output port of the repeater. Since all data frames transmitted between end stations must pass through the repeater, the management unit may conveniently monitor and accumulate statistics about the operation and performance of the network.

A conventional managed repeater processes received data packets as follows. A data packet is received at an input port of the repeater. The repeater retransmits the data packet to a MAC of a management unit attached to an output port of the repeater. The MAC strips preamble information and the SFD from the retransmitted data packet and performs error checking on the remainder of the data packet. The MAC writes the data packet into a memory, such as a RAM. A microprocessor of the management unit reads the contents of the memory and processes it to extract statistics about the data packet. The MAC either writes an entire frame or no part of the frame. The decision to write is based upon whether an error was detected, or whether there was a match between the MAC address and the destination address field of the data packet.

In some instances, there may be thousands of data packets passing through the repeater every second. Based upon the procedure outlined above, a very large memory, a high performance microprocessor, and a high bandwidth bus are required for the management unit to adequately process all the traffic on the network.

While processing every packet to gather statistics about the network provides a good picture of how the network is performing, providing the management unit with resources to adequately process every packet is often too costly of a solution.

A network administrator is able to develop an acceptably accurate profile of the network performance by extracting statistics from a subset of all the data packets, provided that the subset is properly selected. Depending upon the packet selection criteria, the network statistics developed from the subset of packets reflects the network performance as a whole.

SUMMARY OF THE INVENTION

The present invention provides apparatus and method for simply and efficiently implementing a sampling process to sample a subset of data packets transmitted over a computer network. The present invention provides for selectively passing fewer data packets to a management unit than are transmitted over the network. The management unit using the preferred embodiment can be implemented with a smaller RAM, a slower microprocessor, and a lower bandwidth bus. For example, with the repeater passing one packet per thousand and with the network transmitting 3,000–4,000 data packets per second, the management unit may process only 3–4 packets per second, rather than all of the packets.

According to one aspect of the invention, the data packet sampling system includes a sampling repeater for receiving an input data packet, having a destination address field, at an input port. The sampling repeater retransmits the input data packet as an output data packet, disrupts the output data packet, and inhibits, responsive to a plurality of disrupt control signals, disruption of the output data packet when one of the plurality of disrupt control signals is asserted. The sampling system additionally includes a sampler for periodically asserting a particular one of the plurality of disrupt control signals.

Further, in the preferred embodiment, the sampler of the data packet sampling system includes a sampling queue controlled by a queue controller. The sampler has a microprocessor interface, allowing the microprocessor to write selected values into the sampling queue. These values each represent a sampling interval. When each sampling interval expires, the data packet sampling system transmits a packet to the management unit.

In operation, a microprocessor loads the sampling queue with various values representing sampling intervals selected according to some selection algorithm. The particular selection algorithm chosen is dependent upon many factors and plays no particularly relevant part in the present invention, other than providing the actual sampling interval values.

The sampling queue is loaded with these values and the traffic on the network is monitored. Every time that a valid data packet is received, the value corresponding to the least recently added position of the sampling queue is decremented. When this value equals zero, a sampling signal is asserted. The sampling signal controls retransmission of the data packet to a management unit. When the sampling signal is asserted, the repeater sends the data packet to the management unit. When the sampling signal is deasserted, the repeater transmits a disrupted packet to the management. The disrupted packet is discarded by the management unit, with undisrupted packets processed.

After asserting the sample signal, the sampler uses the next least recently added value. The process continues as long as sampling is desired.

Various alternatives and modifications are possible. In the preferred embodiment, the invention is implemented as part of a secure repeater wherein data packet retransmission is controlled based upon a destination address within the data packet. It is not necessary however, as the present invention could be implemented within conventional repeaters.

Additionally, the present invention includes features for resetting the sampling queue, and providing for various default operational modes. In one embodiment, a single value stored in the sampling queue results in continued sampling at the specified interval. This mode is desirable when a user does not require variation in the sampling interval. This mode has an advantage in not requiring continuous attention from the management unit to update the sampling intervals.

One implementation of the reset function in the preferred embodiment provides for changing the sampling intervals written into the sampling queue. In some instances, network traffic may be too light when compared to sampling intervals written into the sampling queue. In these instances, too few sampling packets will be processed. Therefore, the preferred embodiment provides for resetting the relatively large sampling intervals with smaller values by overflowing the sampling queue with the newer values. When full, values written into the sampling queue replace existing values. By writing a sufficient number of new values, the actual number required depending upon the size of the sampling queue and values stored in the queue, new sampling intervals are established.

One feature of the preferred embodiment is to not only pass selected sample packets, but also to pass undisrupted data packets specifically addressed to the MAC of the management unit.

In still another feature of the present invention, there are times when data packets addressed to the management unit are also selected to be sample packets. The present invention identifies such data packets so that they may be properly handled by the management unit.

Reference to the remaining portions of the specification, including the drawing and claims, will realize other features and advantages of the present invention. Further features and advantages of the present invention, as well as the structure and operation of various embodiments of the present invention, are described in detail below with respect to accompanying drawing. In the drawing, like reference numbers indicate identical or functionally similar elements.

BRIEF DESCRIPTION OF THE DRAWINGS

FIG. 3 is a block schematic diagram of a network of a plurality of personal computers implementing a star topology, the network including a managed repeater at each hub;

FIG. 4 is a block diagram schematically illustrating a preferred embodiment of a managed repeater;

FIG. 5 is a schematic block diagram of a sampling repeater;

FIG. 6 is a detailed block diagram of a sampler used in the sampling repeater shown in FIG. 5; and FIG. 7 is a detailed schematic diagram of the transmitter shown in FIG. 5.

DESCRIPTION OF THE PREFERRED EMBODIMENT

Figure 1:
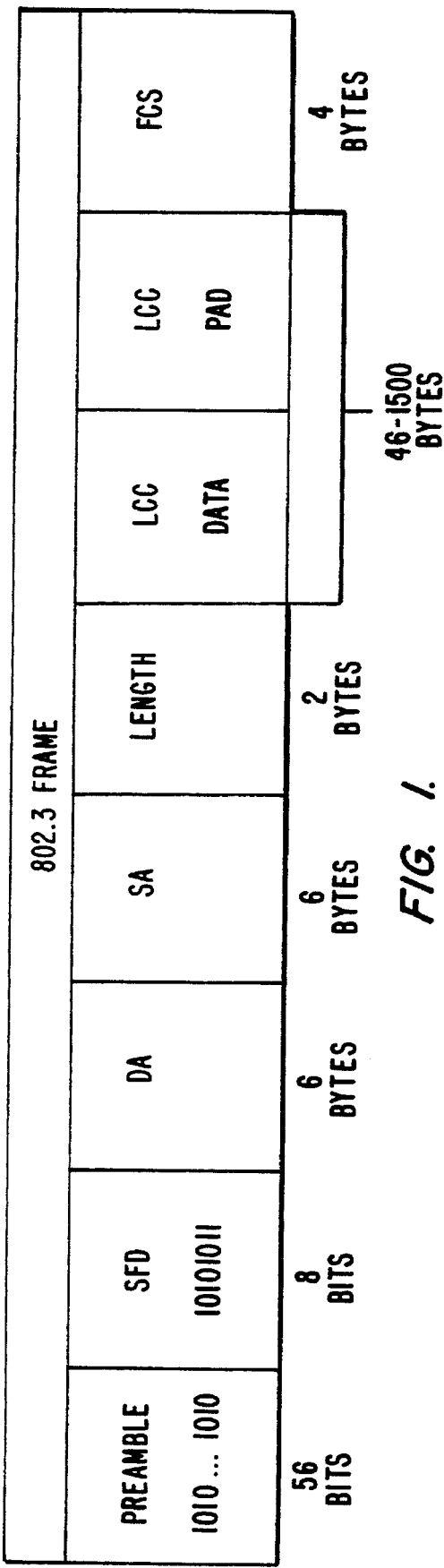
FIG. 1 is a diagram illustrating an IEEE 802.3 compliant frame format.
Figure 2:
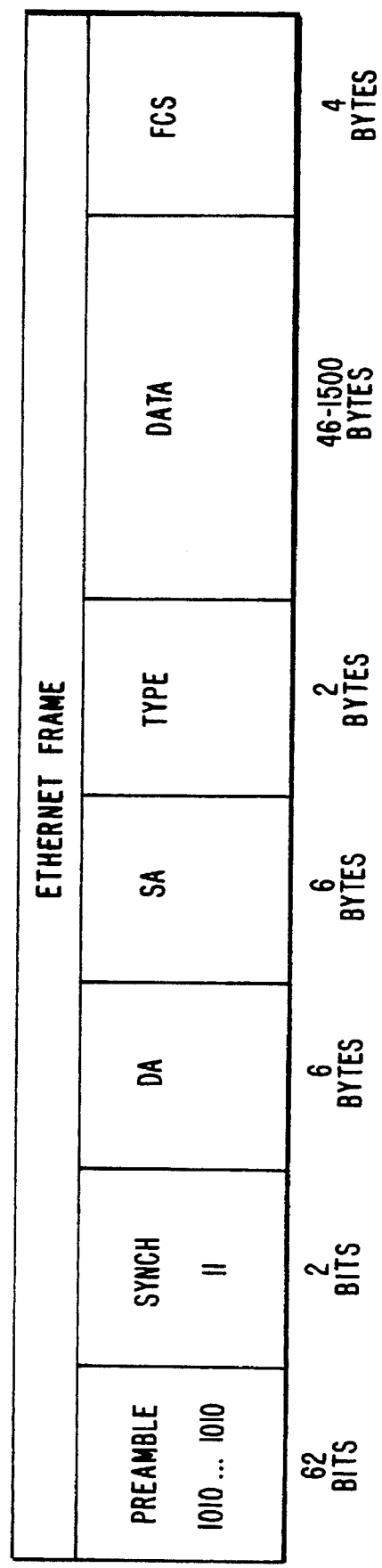
FIG. 2 is a diagram illustrating an Ethernet compliant frame format.

FIG. 3 is a block schematic diagram of a network 10 of a plurality of end stations 15 (e.g. personal computers) implementing a star topology, network 10 includes a secure repeater 20 at each hub, and a managed repeater 25 at one hub. The preferred embodiment is implemented using a carrier sense multiple access with collision detection (CSMA/CD) compliant network. Secure repeaters 20 and managed repeater 25 each conform to the incorporated IEEE Standard 802.3.

In operation, network 10 passes a data packet from one end station 15, through one or more secure repeaters 20 and/or managed repeater 25, to another end station 15. Secure repeater 20 receives the data packet at one port, and retransmits the data packet from other ports. Secure repeater 20 implements security features, such as data packet data masking, as described in the incorporated references. Managed repeater 25 periodically samples a data packet from the network and processes it to establish a statistic or management information base. Managed repeater 25 optionally includes security features similar to those of secure repeater 20.

FIG. 4 is a block diagram schematically illustrating a preferred embodiment of managed repeater 25 shown in FIG. 3 implementing selective sampling. Managed repeater 25 includes a sampling repeater 28 coupled to a management unit 30. Management unit 30 includes a MAC 32, a memory 34 (e.g., random access memory (RAM)), and a microprocessor 36. Management unit 30 is coupled to an output port (such as a management port) of sampling repeater 28. MAC 32 is also coupled to an internal bus 38 of management unit 30 that interconnects MAC 32, RAM 34, and microprocessor 36. Sampling repeater 28 includes an interface coupled to internal bus 38.

In operation of the preferred embodiment, microprocessor 36 writes values into sampling repeater 28 using internal bus 38 to convey a series of sampling intervals. Sampling repeater 28 retransmits an output data packet on the output port for each received data packet from DTE 15. The output data packet is undisrupted when either of two conditions is satisfied: (1) the output data packet is addressed to management unit 30 (an addressed packet), or (2) the present sampling interval expires (a sampled packet).

In other instances, the output data packet is disrupted. When MAC 32 receives a disrupted data packet, the data packet fails its CRC check, causing MAC 32 to discard the output packet. When the output data packet is not disrupted, the output data packet passes the CRC check. MAC 32 stores sampled packets in RAM 34 and passes addressed packets to microprocessor 36. Microprocessor 36 reads the stored packet and processes it to extract statistics.

FIG. 5 is a schematic block diagram of sampling repeater 28 shown in FIG. 4. Sampling repeater 28 includes a repeater front-end 50, a controller 55, a shift register 60, a MAC address compare circuit 65, a transmitter 70, and a sampler 75. In the preferred embodiment, the components of sampling repeater 28, other than repeater front-end 50, make up a data sampling system to route undisrupted MAC destined packets to an output port coupled to management unit 30 (shown in FIG. 4). The data sampling system also periodically routes selected sample packets to management unit 30 according to a specified set of sampling intervals, referred to as a sampling schedule. The term 'periodically' means that the data sampling system selects more than one sample packet but less than all data packets. The term periodic does not necessarily mean that the all the sampling intervals are equal. In some applications, it may be preferable that sampling intervals be somewhat 'random' and of different durations to produce the most accurate statistics.

For ease of explanation, only the structure and operation of the data sampling features of sampling repeater 28 are discussed further. Repeater front-end 50 receives a data packet at a particular one port of a plurality of input ports $85_i$, i=1 to n, with n being the number of ports. Repeater front-end 50 processes the data packet in conformance with the incorporated IEEE 802.3 standard.

Repeater front-end 50 drives an ENABLE signal, a VALID signal, and a DATA signal that is a serial output stream. The DATA signal is driven with the data from the input data packet. The ENABLE signal is asserted once, and as long as, repeater front-end 50 drives DATA with valid data from the data packet. The VALID signal is asserted by repeater front-end 50 after receiving the data packet to indicate that the received data packet was valid.

Controller 55 is coupled to repeater front-end 50 and receives the ENABLE signal, the VALID signal, and the DATA signal. Controller 55 includes logic to controllably assert a SHIFT_ENABLE signal, a COMPARE signal, a PASS signal, a DECREMENT signal, and a LOAD signal responsive to the ENABLE, VALID and DATA signals, as well a SAMPLE signal provided from sampler 75.

Controller 55 monitors the DATA signal and detects the start of frame delimiter (SFD). As long the ENABLE signal remains asserted following detection of the SFD, controller 55 counts the incoming bits of DATA. The destination address field is the first forty-eight bits following the SFD. Controller 55 asserts the PASS signal while the destination address field is being loaded into shift register 60, and until the MAC address compare process described later is completed.

After counting to forty-eight, controller 55 deasserts the SHIFT_ENABLE signal (to lock the destination address into shift register 60), asserts the COMPARE signal, and deasserts PASS after a short delay. Controller 55 monitors the VALID signal, the signal that indicates whether the input data packet was valid. If the VALID signal is asserted, controller 55 of the preferred embodiment asserts either the DECREMENT signal (when SAMPLE is not asserted) or the LOAD signal (when SAMPLE is asserted) upon completion of the retransmission of the data packet. Note that in the preferred embodiment, the LOAD signal will not be asserted in response to an invalid data packet. Thus, sampling repeater 28 will only sample valid data packets. In other applications, this feature may be deselected, allowing sampling repeater 28 to sample, retransmit and process invalid data packets.

Shift register 60 is coupled to both repeater front-end 50 and controller 55. Shift register 60 is a right shifting register that receives DATA at its input. Shift register 60 is responsive to an assertion of the SHIFT_ENABLE signal to shift bits of DATA into its memory. Shift register 60 holds forty-eight bits (six bytes), corresponding to the size of the destination address field of the data packet. The bits stored in shift register 60 are output on a forty-eight bit wide output. Deassertion of the SHIFT_ENABLE signal prevents further bits from the DATA signal from being shifted into shift register 60.

MAC address compare circuit 65 is coupled to controller 55 and shift register 60. MAC address compare circuit 65 may be an associative memory that associates one or more MAC destination addresses with output ports. MAC address compare circuit 65 matches a MAC address of a MAC of a management unit coupled to an output port with the specific port. In the preferred embodiment, there is a single stored MAC address for a management unit that is coupled to a special management port. In some embodiments, the management port will be an ordinary output port of managed repeater 28.

MAC address compare circuit 65 of the preferred embodiment includes one EQUAL output line corresponding to the management port. When COMPARE is asserted, MAC address compare circuit 65 compares the forty-eight bits output from shift register 60 to the management unit's MAC address stored in memory. When a match is detected MAC address compare circuit 65 asserts EQUAL.

Transmitter 70 receives the DATA signal from repeater front-end 50, and responsive to disrupt control signals, retransmits an output data packet to the management port. In the preferred embodiment, unless one of the disrupt control signals is asserted, transmitter 70 disrupts the DATA signal and retransmits the disrupted data packet to the management port. When one or more of the disrupt control signals are asserted, transmitter 70 retransmits the DATA signal undisrupted. Since the DATA signal is a serial data stream in the preferred embodiment, it is possible to retransmit one or more parts of the DATA signal disrupted and one or more parts undisrupted by changing the disrupt control signals during retransmission of the DATA signal. In the preferred embodiment, the disrupt control signals include the PASS signal, the EQUAL signal, and the SAMPLE signal. Assertion of any of these signals results in retransmission of an undisrupted DATA signal.

Sampler 75 controls the SAMPLE signal. As noted above, sampler 75 includes a microprocessor interface for receiving a sampling interval. Sampler 75 is responsive to the DECREMENT signal and to the LOAD signal to control the SAMPLE signal. The preferred embodiment represents each sampling interval as a numerical value.

In response to the DECREMENT signal, sampler 75 adjusts (decreases) the number representing the present sampling interval by one. After decrementing, sampler 75 compares the adjusted value to zero. If equal, sampler 75 asserts the SAMPLE signal. The assertion of the SAMPLE signal causes controller 55 to assert the LOAD signal. Assertion of LOAD results in a new sampling interval being used by sampler 75. Additional details of the structure and operation of sampler 75 are described below with respect to FIG. 6. The SAMPLE signal is also output from sampling repeater 28 to allow the management unit to properly handle instances when a sampled packet is also an addressed packet.

In operation, a microprocessor of a management unit coupled to the management port loads a first number, representing a first sampling interval, and a second number, representing a second sampling interval, into sampler 75. Repeater front-end 50 receives an input data packet at one of its input ports $85_i$. Repeater front-end 50 drives DATA with the serial bits contained in the input data packet and asserts ENABLE and VALID when DATA is present and valid, respectively. Forty-eight bits immediately following the start of frame delimiter make up the destination address field.

Controller 55 counts the incoming bits of DATA. SHIFT_ENABLE remains asserted until the destination address is shifted into shift register 60, at which point shift register 60 is locked by deasserting SHIFT_ENABLE. Controller 55 asserts PASS until the destination address has been locked into shift register 60, and the compare process is complete. Controller 55 asserts COMPARE after deasserting SHIFT_ENABLE.

Assertion of COMPARE causes MAC address compare circuit 65 to compare the destination address to the stored MAC address of the management unit. When the destination address stored in shift register 60 is compared with the stored addresses, an EQUAL signal is asserted when a match is found. The EQUAL signal is asserted for the management port in response to a matching associated stored address.

Transmitter 70 receives disrupt control signals from controller 55, MAC address compare circuit 65, and sampler 75. The PASS signal ensures that transmitter 70 always retransmits undisrupted the destination address field of every DATA signal. Thereafter, if neither the EQUAL signal or the SAMPLE signal is asserted, transmitter 70 begins disrupting the DATA signal. The management unit ignores output data packets having disrupted portions.

After each valid data packet, controller 55 asserts the DECREMENT or LOAD signal to sampler 75. For an assertion of the DECREMENT signal, sampler 75 thereupon adjusts the first value and compares its adjusted value to zero. When a match is detected, the SAMPLE signal is asserted and transmitter 70 retransmits the next DATA signal wholly and completely undisrupted. The management unit processes the sample packet because it is undisrupted.

After the sample packet is retransmitted, controller 55 asserts the LOAD signal to sampler 75. Assertion of the LOAD signal results in sampler 75 using the second number for the sampling interval. Sampler 75 compares the present value of new sampling interval to zero, and if there is no match, deasserts the SAMPLE signal.

Independent of sampler 75, MAC address compare circuit 65 compares the destination address field of each input packet with the MAC address of the management unit. When a match is found (the data packet is destined for the management unit), MAC address compare circuit asserts the EQUAL signal. Controller 55 is designed so that the destination address compare procedure completes prior to deassertion of the PASS signal. Thus, assertion of the EQUAL signal (when a match occurs) happens before the PASS signal is deasserted, allowing the entire DATA signal to be retransmitted undisrupted.

The management unit can use the external SAMPLE signal to signal instances when the input data packet is both a sampled packet and an addressed packet.

FIG. 6 is a detailed block diagram of sampler 75 used in sampling repeater 28 shown in FIG. 5. Sampler 75 includes a queue 100, a register 102, and a comparator 104. Queue 100 is implemented as a first-in first-out (FIFO) buffer 110 controlled by a queue controller 112. FIFO 110 stores up to N number of sampling intervals (SAMP_$INT_x$, X=1 to N). FIFO 110 logically maintains an order of the sampling intervals, from a least recently entered value (SAMP_$INT_1$), to a most recently entered value (SAMP_$INT_N$). In response to an assertion of the LOAD signal, queue 100 writes the value of SAMP_$INT_1$ into register 102. SAMP_$INT_1$ is written into register 102 as COUNT. COUNT is decremented in response to each assertion of the DECREMENT signal, with COUNT also provided to comparator 104. When COUNT equals zero, comparator 104 asserts the SAMPLE signal.

When the SAMPLE signal is asserted, controller 55 shown in FIG. 5 asserts the LOAD signal after the sampled data packet is retransmitted to the management port, if the sampled data packet was valid. The assertion of the LOAD signal advances the sampling intervals in queue 100. Generally, advancing queue 100 results in queue controller 100 discarding SAMP_$INT_1$ and substituting SAMP_$INT_x$ with SAMP_$INT_{x+1}$, for X=1 to N-1. Thereafter, the process proceeds with COUNT equal to the new value of SAMP_$INT_1$ that was originally stored in SAMP_$INT_2$.

In the general case, the cycle continues until all of the sampling intervals have been written into register 102. The microprocessor of the management may, through the microprocessor interface of queue control 112, write additional values representing additional sampling intervals, or alter existing values.

Special handling procedures are used in the preferred embodiment for certain conditions. Some of these conditions include reset:, default operation, and processing when FIFO buffer 110 becomes empty, or full.

Queue control 112 is able to be configured so that a default sampling interval is used whenever no other sampling interval is expressly entered or available. Queue control 112 writes the default sampling interval into SAMP_$INT_1$ in response to every assertion of the LOAD signal, when this feature is enabled.

Power-on reset: defaults with zeros being written into every storage location and FIFO 110 marked as empty. With FIFO 110 empty, sampler 75 constantly asserts the SAMPLE signal, thereby sampling every data packet. It is possible to default to other values, such as to the default sampling interval explained above, depending upon a particular application.

An additional feature of the preferred embodiment is demonstrated when processing a last sampling interval written into FIFO buffer 110. Rather than using a default sampling interval after the last value is loaded into register 102, the preferred embodiment permits the last value to stay in SAMP_INT$_1$ until expressly written over. Queue control 112 detects the condition when FIFO 110 is empty. When FIFO 110 is empty, the preferred embodiment is enabled to reuse the most recently written value.

The most recently written value is loaded into register 102 in response to an assertion of the LOAD signal, when FIFO 110 is empty and the reuse feature is enabled. In other embodiments, FIFO 110 could provide the default value, or a zero value, to register 102 in response to the assertion of the LOAD signal. This feature allows the management unit to write a single value into queue 100 without having to keep updating the sampling intervals. For uncomplicated sampling schedules, this feature simplifies the task of sampling packets of the network.

When queue control 112 detects that FIFO 110 is full, new values that are attempted to be written may have different effects on operation of sampler 75. In the preferred embodiment, writing a new sampling interval value into FIFO 110 causes the value in SAMP_INT$_1$ to be discarded, the sampling intervals to be advanced in FIFO 110, and the present value in register 102 to be immediately overwritten with the least recently written sampling interval value. The preferred embodiment thereby permits readjustment of sampling intervals, such as may be desirable if initial sampling intervals are too large when applied to a network with light traffic. Other embodiments are possible, such as discarding the top value of FIFO 110 without overwriting register 102, or preventing FIFO 110 from being overflowed.

FIG. 7 is a detailed schematic diagram of transmitter 70 shown in FIG. 5. Transmitter 70 includes a D flip-flop 200, a multiplexer 205, and a triple input OR gate G1. Multiplexer 205 includes two data inputs, a select input, and an output. The value of a SELECT signal provided to the select input selects one of the two data inputs to route to the output. When the SELECT signal has a "0" value, a first one of the data inputs is routed to the output. Similarly, when the SELECT signal has a "1" value, a second one of the data inputs is routed to the output. The output of multiplexer 205 is the output of transmitter 70.

D flip-flop 200 includes a data input ("D"), and an inverted output ("$\overline{Q}$"). The output of multiplexer 205 is coupled to the data input of D flip-flop 200. The inverted output $\overline{Q}$ is coupled to the first data input of multiplexer 205. The DATA signal from repeater front-end 50 shown in FIG. 5 is provided to the second data input of multiplexer 205.

The disrupt control signals, EQUAL, SAMPLE, and PASS, are provided as inputs into OR gate G1. An output of OR gate G1 is coupled to the select input of multiplexer 205 and provides the SELECT signal.

In operation, when any of the disrupt control signals are asserted, the SELECT signal will be a "1" resulting in the DATA signal being transmitted from transmitter 70. Without any of the disrupt signals being asserted, the SELECT signal is a "0" resulting in transmitter 70 transmitting an alternating series of "1's" and "0's".

As described, sampling repeater 28 provides for selective and programmable data packet sampling of a subset of input data packets according to a predetermined sampling schedule.

In conclusion, the present invention provides a simple, efficient solution to selective data packet sampling in a computer network. While the above is a complete description of the preferred embodiments of the invention, various alternatives, modifications, and equivalents may be used.

For example, the queue was described as a FIFO buffer, but other queue implementations are possible. Also, it is not necessary to implement the present invention in a secure repeater as described in the preferred embodiment. Nor is the present invention limited to only decrementing/loading upon valid data packets. It is possible to implement the present invention to sample invalid packets. Furthermore, rather than implementing the SAMPLE signal as an externally accessible signal, it is possible to make the SAMPLE signal a tag (data packet statistic) and package the tag with the data packet as described in the incorporated patent application Ser. No. 08/337,635.

Therefore, the above description should not be taken as limiting the scope of the invention which is defined by the appended claims.

What is claimed is:

1. A data packet sampling system, comprising:

a repeater for:
receiving an input data packet, having a destination address field, at an input port;
retransmitting said input data packet as an output data packet;
disrupting said output data packet; and
inhibiting, responsive to a disrupt control signal, disruption of said output data packet when said disrupt control signal is asserted; and a sampler, coupled to said repeater, for periodically asserting said disrupt control signal to said repeater.

2. The data packet sampling system of claim 1 wherein said sampler includes a sampling queue for storing a first value identifying a first sampling interval, said sampler adjusting said first value responsive to an assertion of a received packet signal to produce an adjusted value and asserting said disrupt control signal when said adjusted value is within a predetermined range of a predetermined value.

3. The data packet sampling system of claim 2 wherein said sampler produces said adjusted value by decrementing said adjusted value for each received data packet and wherein said received packet signal is a decrement signal.

4. The data packet sampling system of claim 3 wherein said predetermined value is zero and wherein said sampler asserts said disrupt control signal when said adjusted value equals zero.

5. The data packet sampling system of claim 2 wherein said sampling queue stores a second value identifying a second sampling interval.

6. The data packet sampling system of claim 5 wherein said second sampling interval is different from said first sampling interval.

7. The data packet sampling system of claim 5 wherein said sampler substitutes said second value for said first value after asserting said disrupt control signal.

8. The data packet sampling system of claim 7 wherein said sampler substitutes said second value for said first value in response to an assertion of a load signal.

9. The data packet sampling system of claim 8 wherein said controller asserts said packet receive signal after each valid received data packet unless said disrupt control signal is asserted, then said controller asserting said load signal after receiving a valid data packet when said disrupt control signal is asserted.

10. The data packet sampling system of claim 9 wherein said sampler sets said first value equal to a preselected value and sets said sampling queue to a predetermined state in response to a reset signal.

11. The data packet sampling system of claim 10 wherein said preselected value is zero.

12. The data packet sampling system of claim 10 wherein said predetermined state is empty.

13. The data packet sampling system of claim 9 wherein said sampler resets said adjusted value to said first value in response to an assertion of said load signal when said sampling queue has a predetermined state.

14. The data packet sampling system of claim 13 wherein said predetermined state is empty.

15. The data packet sampling system of claim 9 wherein said sampler resets said adjusted value to a default value in response to an assertion of said load signal when said sampling queue has a predetermined state.

16. The data packet sampling system of claim 15 wherein said predetermined state is empty.

17. The data packet sampling system of claim 9 wherein said sampler includes a microprocessor interface, the data packet sampling system further comprising:

a microprocessor coupled to said microprocessor interface for writing said first value into said sampling queue.

18. The data packet sampling system of claim 17 wherein said microprocessor writes said first value by writing said second value and thereafter writing a subsequent value such that said second value overwrites said first value and said subsequent value overwrites said second value.

19. The data packet processing system of claim 1 wherein said sampler comprises:

a sampling queue, including a FIFO buffer for storing a sampling interval and a queue control, coupled to said FIFO buffer and responsive to a load signal, for controlling said FIFO buffer;

a register, coupled to an output of said FIFO buffer, for storing said sampling interval as a count interval responsive to an assertion of said load signal, said register responsive to an assertion of a received packet signal to adjust said count interval stored in said register by a predetermined amount; and a comparator,, coupled to an output of said register, for asserting said disrupt control signal when said count interval stored in said register is within a predetermined range of a preselected value.

20. The data packet processing system of claim 19 wherein said register decrements said count interval by one for each assertion of said received packet signal and said comparator asserts said particular one disrupt control signal when said count interval equals zero.

21. The data packet processing system of claim 19 wherein said FIFO buffer stores a second interval, and wherein said queue control overwrites said first sampling interval with said second sampling interval when a third sampling interval is written to said sampling queue and said sampling queue is in a predetermined state.

22. The data packet processing system of claim 21 wherein said predetermined state is a full state.

23. The data packet processing system of claim 22 wherein said sampler immediately writes said first sampling interval into said register when said third sampling interval is written into said sampling queue.

24. A method for sampling a data packet in a secure repeater having a transmitter that disrupts a retransmitted data packet unless a disrupt control signal is asserted, the data packet sampling method comprising the steps of:

loading a value representing a sampling interval into a sampler;

adjusting said value in response to each received data packet to produce an adjusted value;

comparing said adjusted value to a predetermined value to determine whether said adjusted value is within a predetermined range of said predetermined value; and asserting a sample signal as said disrupt control signal when said adjusted value is within said predetermined range of said predetermined value.

25. A data packet sampling system, comprising:

a repeater, including a transmitter, for disrupting a retransmitted data packet on a port unless a disrupt control signal is asserted;

a management unit, coupled to said port of said repeater, for processing a sampled data packet; and means, coupled to said transmitter, for periodically asserting a sample signal to said transmitter as said disrupt control signal such that only a selected data packet is retransmitted undisrupted to said management unit.

26. In a network including a plurality of repeaters, a particular sampling repeater comprising:

a data packet sampling system for:
receiving an input data packet, having a destination address field, at an input port;
retransmitting said input data packet as an output data packet;
disrupting said output data packet; and
inhibiting, responsive to a plurality of disrupt control signals, disruption of said output data packet when one of said plurality of disrupt control signals is asserted; and a sampler, coupled to said data packet sampling system, for periodically asserting a particular one of said plurality of disrupt control signals to said data packet sampling system.

27. A data packet sampling system for processing a plurality of input data packets transmitted over a network, comprising:

a management unit for extracting statistics for the network from a group of data packets;

a repeater, coupled to said management unit and to the network, for receiving the plurality of input data packets; and a sampler, coupled to said repeater, for sampling a subset of the plurality of input data packets and for providing said subset of data packets to said management unit as said group of data packets, wherein said subset of data packets is less than the plurality of data packets.

28. A data packet sampling system, comprising:

a repeater, including a transmitter, for disrupting a retransmitted data packet, wherein said repeater does not disrupt said retransmitted data packet in response to an assertion of a disrupt control signal; and means, coupled to said repeater, for periodically asserting said disrupt control signal to said repeater independent of data in the data packet.

\* \* \* \* \*